United States Patent [19]
Dickson et al.

[11] 3,740,011
[45] June 19, 1973

[54] TILTABLE INSTRUMENT SUPPORT HEAD

[75] Inventors: Colin G. Dickson, Los Altos; Kenneth A. Wickersheim, Palo Alto, both of Calif.

[73] Assignee: Spectrotherm Corporation, Mountain View, Calif.

[22] Filed: Apr. 17, 1972

[21] Appl. No.: 244,646

[52] U.S. Cl. ............................................. 248/183
[51] Int. Cl. .......................................... F16m 11/12
[58] Field of Search ............... 248/182, 184, 185, 248/178, 179

[56] References Cited
UNITED STATES PATENTS

| 2,256,556 | 9/1941 | Gibbons | 248/183 |
| 2,796,226 | 6/1957 | Dalton et al. | 248/183 |
| 3,545,710 | 12/1970 | Mooney | 248/183 |

FOREIGN PATENTS OR APPLICATIONS

| 807,555 | 1/1959 | Great Britain | 248/183 |
| 517,503 | 1/1920 | France | 248/178 |
| 427,061 | 9/1924 | Germany | 248/185 |

Primary Examiner—Marion Parsons, Jr.
Attorney—Karl A. Limbach, George C. Limbach, Gerald P. Parsons et al.

[57] ABSTRACT

A cradle for attachment to an instrument is supported along a curved bottom surface against gravity by spatially separated rollers on a base member. A crank extending from one end of the cradle moves the curved bottom surface of the cradle over its supporting rollers by pulling against a chain that is fixed to the base member. There is a worm gear connection communicating motion from the crank handle to the chain.

15 Claims, 4 Drawing Figures

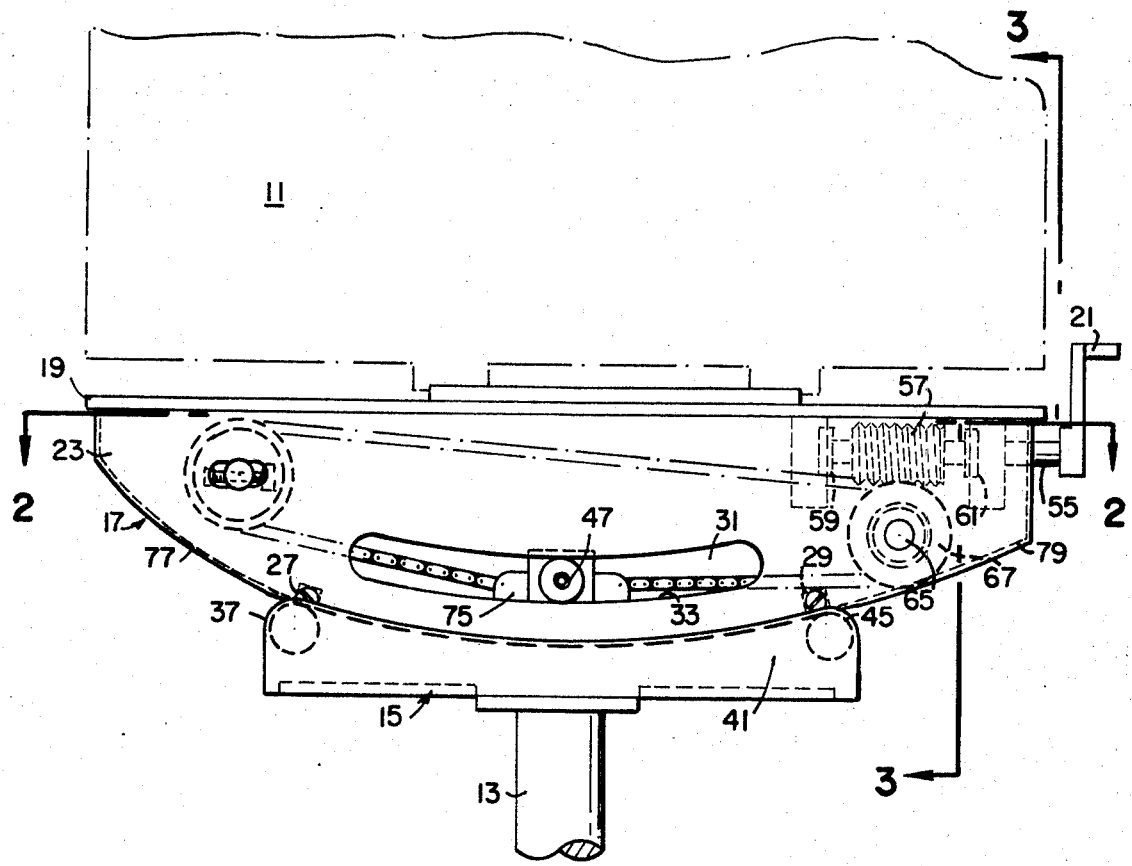
FIG_1
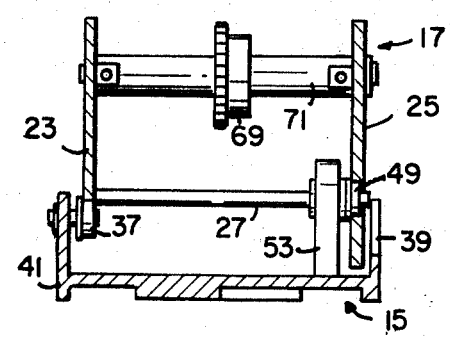
FIG_4

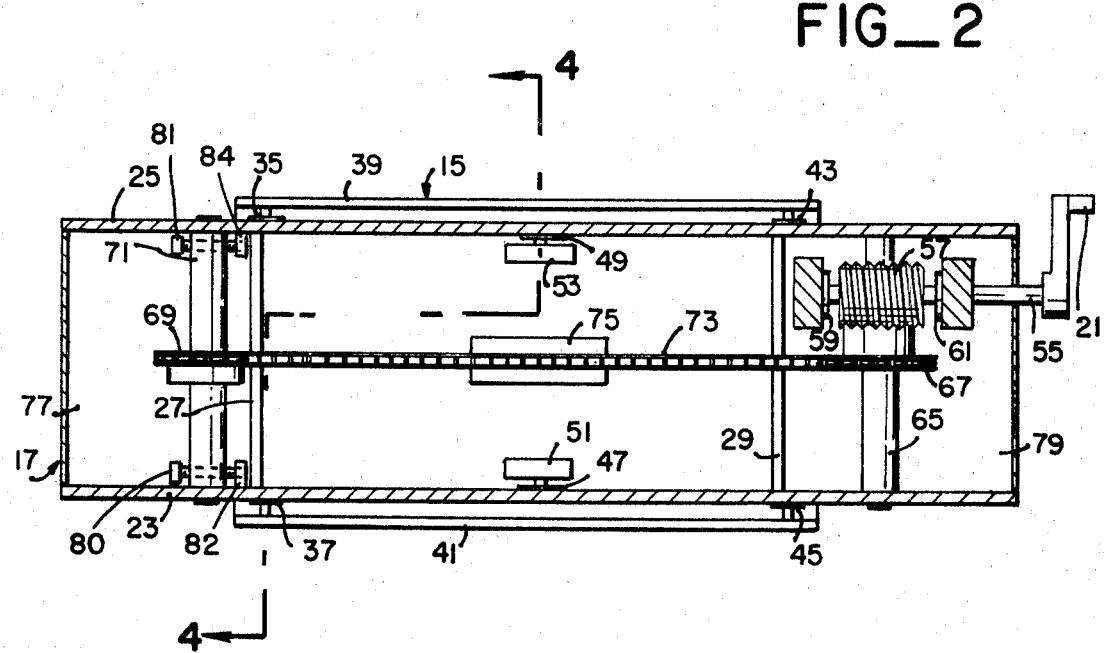
FIG_2
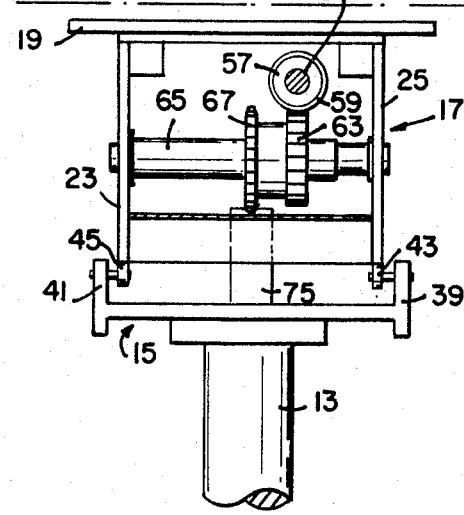
FIG_3

3,740,011

TILTABLE INSTRUMENT SUPPORT HEAD

BACKGROUND OF THE INVENTION

This invention relates generally to tiltable instrument supporting assemblies and more specifically to the type of assembly wherein a cradle is controllably rocked with respect to a base member.

There are many applications wherein a heavy instrument or other package is to be supported by a stand in a manner that the instrument may be tilted with respect to the stand as desired. Present tiltable supporting heads suffer from certain disadvantages. There are a class of supporting heads made for television cameras and the like which are very complicated and too expensive for other more modest applications. A simpler type of available supporting head utilizes a frictionally engaged ball pivot which is satisfactory for very light instruments but which suffers from several disadvantages for heavier instruments. The primary disadvantage is that the center of gravity of the instrument will shift significantly with respect to the supporting stand as the pivot is rotated, thereby creating very strong strains which makes it difficult to positively control the instrument position and further which provides a risk that the pivot frictional lock will break loose from these strains and cause the instrument to fall.

Cradle heads are available which are designed to pivot about the center of mass of an instrument carried thereby in order to keep the center of mass located substantially over the supporting stand. A difficulty with available cradle support heads is that they rely too heavily on the center of mass being positioned over the supporting stand and thus do not provide very substantial positioning and locking mechanisms. Typically, a simple frictional engagement is utilized to hold the instrument supporting cradle in a selected position with respect to the supporting stand. Thus, for instruments which may have their center of mass subject to shifting somewhat, such as by the addition of an attachment thereto while in use, these types of cradle heads are often unsatisfactory in not providing a more positive positioning and locking mechanism. Also, positioning and locking of existing cradle heads usually requires two separated hand operations, thus making them difficult to manipulate by an operator.

Therefore, it is a primary object of the present invention to provide a tiltable instrument support head that provides the ability for positively controlling its position of tilt and to positively lock it in a desired position with only a single control operation.

It is another object of the present invention to provide a tiltable instrument support head that is simple in construction and economical to manufacture.

It is yet another object of the present invention to provide a tiltable instrument supporting head having a position control handle in a convenient location for all positions of the support head.

SUMMARY OF THE INVENTION

Briefly, these and additional objects are accomplished by the present invention wherein a cradle type of support head is provided with a chain or other positive flexible motion transmission member, the chain extending around two sprocket wheels at opposite ends of the cradle assembly and attached to a base supporting member at a position intermediate of the two sprocket wheels. One of the sprocket wheels is rotatably driven through a worm gear in response to a crank handle extending out of one end of the movable cradle member. The chain provides for positive control of the cradle's position with respect to the base member. The worm gear drive from the crank handle provides for automatic locking of the position of the cradle assembly when the crank is allowed to rest. No separate action on the part of the operator is necessary for locking. The control mechanism is lightweight, simple and economical to manufacture. By providing the single control handle on the movable member, it is always available to the operator regardless of the position of tilt of the cradle member.

One type of instrument which may be supported by a tiltable supporting head according to the present invention is a thermograph which is positioned with respect to a human patient for providing pictures in the optical domain of the human patient as viewed in the infrared domain. This sometimes requires that a heavy thermograph instrument be used over a patient bed in a hospital and thus the support head must provide positive locking of angular position in order to reduce the risk of injury to the patient. Such an instrument is usually used with a camera attachment which varies the center of mass of the instrument, thus further requiring a positive locking mechanism for the cradle support assembly. The chain drive mechanism of the preferred embodiment of the present invention is preferred over a direct gear drive for reasons of economy and a resulting ability to position the crank handle on the tilting cradle member so that the handle will be in a convenient location for all positions of the moving member.

Additional advantages and objects of the present invention are described in the following description of its preferred embodiments, which description should be taken in conjunction with the drawings.

BRIEF DESCRIPTION OF THE DRAWINGS

FIG. 1 is a side view of an instrument support head according to the present invention showing in dotted lines the internal driving and positioning mechanism;

FIG. 2 is a top view of the interior portion of the cradle assembly of FIG. 1 taken across section 2—2 thereof;

FIG. 3 is an end view of the cradle assembly of FIG. 1 taken across a section 3—3 thereof; and FIG. 4 is an interior view of the cradle assembly of FIG. 1 taken across section 4—4 of FIG. 2.

DESCRIPTION OF THE PREFERRED EMBODIMENTS

An instrument 11 is held by a support stand 13 with the aid of a tiltable support head. The support head has two major components, a base member 15 and movable cradle member 17. The cradle 17 includes a planar load supporting surface 19 that is provided with means for rigid attachment to a bottom of the instrument 11. The base member 15 is rigidly attached to the support stand 13. A crank handle 21 is provided to extend from one end of the cradle 17 which, when turned, causes the instrument support surface 19 of the cradle 17 to tilt with respect to the base member 15 and support stand 13.

In the preferred embodiment of the instrument head shown in the drawings, the instrument support surface 19 may be tilted in only one direction. That is, the adjustment of the instrument head provides for only one degree of freedom. For other motion, the support stand 13 may be made rotatable or the base member 15 of the support head may be attached to the stand 13 in a manner to be rotatable with respect thereto.

The cradle 17 has a pair of parallel sides 23 and 25 attached to the sides of the instrument support surface 19 and depending downward therefrom. The sides are held a distance apart at their top by the support surface 19 and by two spacers 27 and 29 provided at the bottom of the cradle assembly 17. Each of the sides 23 and 25 has a curved bottom surface which extends convexly downward. Each of the sides 23 and 25 additionally has a cam slot therein, such as the cam slot 31 shown in the side 23 in FIG. 1. The cam slot 31 has a bottom surface 33 (controlling curved surface) that is curved and generally of the same shape of the bottom surface of the side 23. In a specific example of the preferred embodiment of the present invention shown in the drawings, the bottom surface of the side 23 and the bottom surface 33 of the slot 31 each are arcuately shaped with a single center of curvature located a distance above the support plate 19 and directly over the mounting shaft 13. This center is preferably close to or coincident with the expected center of mass of the instrument 11 to be carried thereby. The carefully controlled arcuate surfaces need extend only for a distance along the length of the sides 23 and 25 that is contacted by supporting rollers attached to the base which are described hereinafter.

The base member 15 carries two pairs of rollers spatially separated along its length in order to support the cradle 17 and the instrument carried thereby against the force of gravity. One pair of rollers 35 and 37 are attached to one end of the base member 15 by being journaled on the inside surfaces of the vertically upturned side walls 39 and 41, respectively. Similarly, a second pair of rollers 43 and 45 are journaled on the inside of the side walls 39 and 41, respectively, of the base member 15. The spatial separation of these two pairs of rollers determines the stability with which the cradle 17 will be held.

In order to prevent the cradle 17 from being tipped up away from one or more of the base support rollers 35, 37, 43 or 45, a roller 47 is provided to ride in the cam slot 31 of the side wall 23 of the cradle 17. Similarly, a second cam slot roller 49 is provided for the cam slot (not shown) in the vertical wall 25. The cam rollers 47 and 49 are held to the base 15 by vertical supports 51 and 53, respectively, which are themselves rigidly attached to the base member. The axes of rotation of all of the six rollers described so far are preferably parallel to each other. Each of the six rollers is preferably a commercially available flanged ball bearing wheel assembly which is supported on a solid round shaft rigidly held by the base member 15. The flanges of the four weight supporting rollers 35, 37, 43 and 45 are preferably disposed on the outside surfaces of the vertical sides 23 and 25 of the cradle 17. This restrains the cradle from undesired lateral movement. The cam slot rollers 47 and 49 preferably have their flanges oriented on the interior surface of the side walls 23 and 25, respectively in order to further stabilize the connection of the cradle 17 to the base 15. Also, to increase stability, the cam slot 31 in the wall 23 and its opposing slot (not shown) of the same shape and position in the wall 25 are made only slightly wider than the diameter of their respective cam rolls 47 and 49 so that the upper edge of the cam slot may also operate to prevent tipping of the cradle 17 off the base 15. The supports 51 and 53 are preferably placed intermediate of the roller pairs 35, 37, and 43, 45 that are at opposite ends of the base 15. Each of the side walls 23 and 25 of the cradle 17 is thus provided with a three-point suspension by using three rollers to support each side wall.

The mechanism for permitting movement of the cradle 17 and for locking it in a desired position of tilt of the load supporting plate 19 with respect to the base 15 is contained within the cradle 17 between its outside walls 23 and 25 and under its load supporting plate 19. The crank 21 is firmly connected to a shaft 55 to which a worm gear 57 is rigidly attached for rotation in response to rotation of the crank 21. The crank and worm gear assembly is supported to the underside of the load supporting plate 19 by bearing and post assemblies 51 and 61 located on opposite sides of the worm gear 57. Teeth of a drive gear 63 (worm wheel) mesh with teeth of the worm gear 57. The drive gear 63 is carried by a drive shaft 65 which in turn is supported at its opposite ends by the walls 23 and 25 of the cradle assembly 17 at one end thereof. The drive gear 63 is connected to a sprocket wheel 67 in a manner that when the crank 21 is turned, the sprocket wheel 67 is rotated. The connection between the drive gear 63 and the sprocket wheel 67 may be a direct one, or, alternatively, may be through the drive shaft 65.

At an opposite end of the cradle assembly 17 is an idler sprocket wheel 69 that is carried by a shaft 71 in a manner to be free to rotate with respect to the cradle 17. The idler shaft 71 is held at its ends by the walls 23 and 25 of the cradle 17. The shaft position is adjustable relative to the sides 23 and 25 to enable taking up slack in the chain, thereby eliminating undesirable movement between the cradle assembly 17 and the base 15. Two screws 80 and 81 are used for parallel adjustment of the idler shaft 71. The screws 80 and 81 threadedly engage the shaft 71 and push against cooperating bases 82 and 84 that are rigidly held by the sides 23 and 25, respectively. The shaft is adjusted by turning the screws 80 and 81 until the chain 73 is taut and there is no movement between the cradle 17 and the base assembly 15.

A chain 73 is carried by the idler sprocket wheel 69 and the driving sprocket wheel 67. The chain 73 is made continuous by rigid attachment in the lower portion of its loop to opposite sides of a fin 75. The fin 75 is rigidly attached to the base member 15. Therefore, as the crank 21 is rotated, the sprocket wheel 67 is rotated which causes its advance along the chain 73 and thus a rotation or tilting of the cradle 17 with respect to the base member 15. Use of the worm gear 57 and its associated drive gear 63 provides for positive locking of the cradle tilt position as soon as an operator stops moving the crank 21.

In order to prevent injury to the operator, the space between the side walls 23 and 25 of the cradle 17 is closed off at its ends. A cover plate 77 is provided at one end thereof and a cover plate 79 at another end thereof. The cover plates extend to a position adjacent the support bars 27 and 29, thus leaving an opening of a sufficient length at the bottom of the cradle 17 to receive the fin 75 and the roller support posts 51 and 53 for all expected angles of tilt of the cradle. It will be noted that since the crank 21 is located on the cradle 17, the member of the supporting head that moves, the crank 21 will always be accessible to an operator for all positions of tilt of the cradle 17.

It will be understood that although the various aspects of the present invention have been described with respect to a specific preferred embodiment thereof, the present invention is entitled to protection within the full scope of the appended claims.

We claim:

1. A tiltable supporting head assembly, comprsing:
   a movable member having a load supporting top surface and a bottom surface in the form of a smooth convex curved portion,
   a base member including means for supporting said movable member at at least two spatially separated locations along said convex curved surface in a manner that the load supporting surface of said movable member tilts with respect to the base member in at least one direction as the curved surface is slid relative to said at least two support positions,
   a crank rotatably held by the moveable member,
   an elongated flexible motion transmission member anchored at one position along its length to said base member, and
   means carried by the movable member and operably connecting said crank and said flexible member for giving motion to said moveable member with respect to the flexible member in response to a rotation of said crank.

2. A tiltable supporting head assembly according to claim 1 wherein said means on said base supporting member for supporting said cradle includes at least one roller rotatably held with respect to said base at each of said at least two spatially separated locations.

3. A tiltable supporting head assembly according to claim 2 wherein said movable member additionally includes a controlling curved surface of the same shape as the bottom curved surface of said cradle and disposed between the bottom curved surface and the load supporting surface, said tiltable supporting head assembly additionally including at least one roller rigidly held to said base member and positioned to ride above said controlling curved surface, whereby said movable member is held onto said base member.

4. A tiltable supporting head assembly according to claim 3 wherein the axes of rotation of said rollers are all parallel.

5. A tiltable supporting head assembly according to claim 1 wherein said convex curved portion at the bottom of said movable member is arcuate with a center of curvature located above said supporting top surface, and further wherein said convex curved bottom surface of the movable member is shaped so that said movable member is limited to one degree of freedom.

6. A tiltable supporting head assembly, comprising
   a movable member having a load supporting top surface and a bottom surface in the form of a smooth convex curved portion,
   a base member including means for supporting said movable member at at least two spatially separated locations along said convex curved surface in a manner that the load supporting surface of said movable member tilts with respect to the base member in at least one direction as the curved surface is slid relative to said at least two support positions,
   an idler wheel rotatably held by said movable member,
   a driving wheel rotatably held by said movable member,
   a flexible motion transmission member positively engaging said idler wheel and said driving wheel and further being attached to said base member at a position intermediate of said idler and driving wheels, and
   means on said movable member for imparting rotary motion to said driving wheel.

7. A tiltable supporting head assembly according to claim 6 wherein said idler wheel and said driving wheel are each sprocket wheels, and further wherein said flexible motion transmission member is a chain.

8. A tiltable supporting head assembly according to claim 7 wherein said means for imparting rotary motion to said driving wheel includes:
   a crank extending on the outside of said movable member for hand rotation relative thereto,
   a worm gear operably attached to said crank for rotation therewith, and
   a driving gear rotatably fixed to said driving wheel and positioned for toothed engagement with said worm gear, whereby rotation of said crank causes said movable member to tilt its load supporting surface with respect to said base.

9. A tiltable supporting head assembly according to claim 6 wherein said means on said base supporting member for supporting said cradle includes at least one roller rotatably held with respect to said base at each of said at least two spatially separated locations.

10. A tiltable supporting head assembly according to claim 9 wherein said movable member additionally includes a controlling curved surface of the same shape as the bottom curved surface of said cradle and disposed between the bottom curved surface and the load supporting surface, said tiltable supporting head assembly additionally including at least one roller rigidly held to said base member and positioned to ride above said controlling curved surface, whereby said movable member is held onto said base member.

11. A tiltable supporting head assembly according to claim 10 wherein the axes of rotation of said rollers are all parallel.

12. A tiltable supporting head assembly, comprising:
    an elongated movable member having a generally planar load supporting top surface and parallel side members of the same shape depending downward therefrom a finite distance apart, said side members having a portion of their bottom edges curving downward in a direction along the length of said movable member,
    a base supporting member having a pair of rollers on each side thereof, each pair of rollers being spatially separated along the length of said base for supporting said movable member along its curved surface,
    a cam slot in each of the side walls of said movable member, the bottom surface of each slot having the same curve as the bottom curved surface of said sides of the movable member,
    a roller positioned each cam slot to roll along its bottom surface, said roller being supported by said base, whereby the roller carried by each cam slot resists separation of the movable member from the base member, and means within said movable member between said side plates for controlling the position of said movable member with respect to said base member, said position controlling means including:

an idler sprocket wheel held by a shaft having a chain tensioning adjustment, said shaft being held within said movable member and extending between said side walls, a driving sprocket wheel carried by a driving shaft that extends between the side walls of said movable member at an end opposite to that of the idler sprocket wheel, a chain carried by said idler and driving sprocket wheels, said chain additionally being anchored to said base member at a position intermediate of the spatially spaced movable member supporting rollers that are carried by said base, a driving gear rotatably fixed to said driving shaft, a worm gear held by said movable member in a position to engage said driving gear, and a crank operably attached to said worm gear for controlling its rotatable position, whereby operation of the crank positively determines the angular position of the load supporting surface of said movable member with respect to said base member.

13. A tiltable supporting head assembly according to claim 12 wherein each of the two pairs of rollers attached at the base and each of the two cam slot rollers attached to the base are all oriented with their axes rotation substantially parallel.

14. A tiltable supporting head assembly according to claim 12 wherein each of the two pairs of movable member supporting rollers attached to the base having a flange along one edge thereof and further wherein said rollers are oriented with the flange of each roller along the outside surface of the side wall of said movable member.

15. A tiltable supporting head assembly according to claim 14 wherein each of the said cam slot rollers has a flange along one edge thereof and is oriented so that the flange is on the interior surface of the side wall of the movable member which it contacts.

* * * * *